United States Patent

Cassen et al.

[15] 3,671,948

[45] June 20, 1972

[54] READ-ONLY MEMORY

[72] Inventors: Quentin C. Cassen, Tustin; James A. Luist, Anaheim; Naif D. Salman, Orange, all of Calif.

[73] Assignee: North American Rockwell Corporation

[22] Filed: Sept. 25, 1970

[21] Appl. No.: 75,739

Related U.S. Application Data

[63] Continuation of Ser. No. 744,719, Nov. 12, 1968.

[52] U.S. Cl. ....................................340/173 SP, 340/172.5

[51] Int. Cl. ....................................G11c 17/00, G11c 11/36

[58] Field of Search ....................................340/173 SP

[56] References Cited

UNITED STATES PATENTS

| | | | |
|---|---|---|---|
| 2,872,664 | 2/1959 | Minot | 340/173 |
| 3,028,659 | 4/1962 | Chow | 340/173 |

*Primary Examiner*—Terrell W. Fears

*Attorney*—L. Lee Humphries and Edward Dugas

[57] ABSTRACT

A microminiature diode array is formed as a high density matrix with at least one diode electrically connecting or not connecting a row of said matrix to a column of said matrix to provide upon electrical interrogation a two-state signal indicative of the presence or absence of a diode at a particular row and column, and wherein parallel-coincident selection of rows and columns occurs with a sensing means provided for each independent sub-array of the matrix.

6 Claims, 6 Drawing Figures

INVENTORS
QUENTIN C. CASSEN
JAMES A. LUISI
NAIF D. SALMAN
BY Edward Dugas
ATTORNEY INVENTORS
QUENTIN C. CASSEN
JAMES A. LUISI
BY NAIF D. SALMAN
Edward Dugas
ATTORNEY INVENTORS
QUENTIN C. CASSEN
JAMES A. LUISI
NAIF D. SALMAN
BY Edward Dugas
ATTORNEY

READ-ONLY MEMORY

This application is a continuation of S.N. 744,719 filed Nov. 12, 1968.

BACKGROUND OF THE INVENTION

This invention relates generally to microminiature circuits and more particularly to a microminiature read-only integrated diode memory.

Read-only memories provide the digital designer with a means to trade some of the convenience and complexity of memory-write electronics for engineering advantages that are particularly desirable in special purpose computing hardware. Examples of the advantages to be gained through the use of read-only memories are lower cost, increased speed performance, increased output signal level, decreased size and weight, decreased operating power, and improved radiation hardness. One diode device of interest is disclosed in U.S. Pat. No. 3,122,680 entitled "Miniaturized Switching Circuit" by R. E. Benn et al. In that particular patent, a diode matrix is disclosed which provides sixteen input signals with thirty-two output signals and whose weight is approximately 150 grams. This particular arrangement, when compared with the banks of relays and switching circuits which would be needed to perform the same signal switching operation, is a considerable improvement in savings of space and weight.

Another device of interest is disclosed in U.S. Pat. No. 3,248,710 entitled "Read-Only Memory" by C. H. Stapper, Jr. In that patent, there is disclosed a matrix switch in combination with one or more read-only memories. The switch comprises an M number of X lines and a N number of Y lines which intersect in a matrix configuration to form an MN number of crosspoints. A negative resistance device biased for bi-stable operation is connected to each crosspoint and is responsive to coincident input signals. The output is read as an indication of the states of the negative resistance device. Fixed information is placed in the read-only memories by the presence or absence of punched holes. The punched holes remove the isolating means between the lines so that when output signals supplied from the matrix switch appear at the memories, preselected information will appear on the second set of lines in accordance with the input signals and the fixed information placed in the memories.

Another device of interest is disclosed in U. S. Pat. No. 3,377,513 entitled "Integrated Circuit Diode Matrix" by R. M. Ashby et al. In that patent, there is disclosed a microminiature integrated circuit diode matrix fabricated on a single crystal, electrically insulating substrate. A plurality of diode elements are disposed on the substrate to form a high density array. A first set of electrical conductors also is disposed on the substrate, each conductor being electrically connected to one terminal of each diode in a corresponding row of the matrix. A second set of conductors, electrically insulated from the first set, crosses the first set. Each conductor of the second set is electrically connected to the second terminal of preselected ones of the diode elements in the corresponding column. As can be seen in FIG. 1 of that patent, each row and each column must individually have an electrical conductor extending from the row or column to some electrical junction point. The necessity for such conductors limits the number of diodes which may be efficiently placed in a given area of substrate material. A unique means for interconnecting the rows and columns of the matrix, in order to minimize the number of leads necessary for operation of the matrix while still allowing the matrix to perform its complete function, is a definite advance in the state of the art. The present disclosure is directed to just such a means.

SUMMARY OF THE PREFERRED EMBODIMENT OF THE INVENTION

In the preferred embodiment of the invention, the diode matrix is formed with a number of conductive rows and columns which are divided into sectors or sub-arrays. A means is provided for parallel-coincident selection of one row and column in each of the sectors. A series resistor is interposed in each row and column when the selected row is electrically connected to the selected column in circuit through diodes. The row ends of each sector are connected together through diodes to individual output terminals. Sensing means are connected to each output terminal. The selector means is connected to the columns for selectively switching two columns from a potential source to ground, and for selectively switching eight rows from ground to a potential source. The application of a potential to a row which is connected by means of a diode to a column, which column in turn is grounded, will cause a current flow through the series resistance through the diode towards ground providing a low-level voltage indication at the output terminal. Substantially all of the potential will be felt at the output terminal when a selected row is not connected through a diode to a selected column.

It is therefore an object of the present invention to provide a novel read-only memory.

It is another object of the present invention to provide a read-only memory with parallel-coincident selection within sub-arrays of the matrix.

It is a further object of the present invention to provide a micro-electronic diode array having a reduced number of access leads.

It is another object of the present invention to provide a diode array in which substantially all of the interrogating potential is available at the output terminal in one state; while in the other state, a neglibible potential is available at the output terminal.

It is a further object of the present invention to provide a read-only memory capable of storing words whose length can be any one of a number of optional lengths.

These and other objects of the present invention will become more apparent when taken in conjunction with the following description and drawings.

DESCRIPTION OF THE PREFERRED EMBODIMENTS

Figure 1:
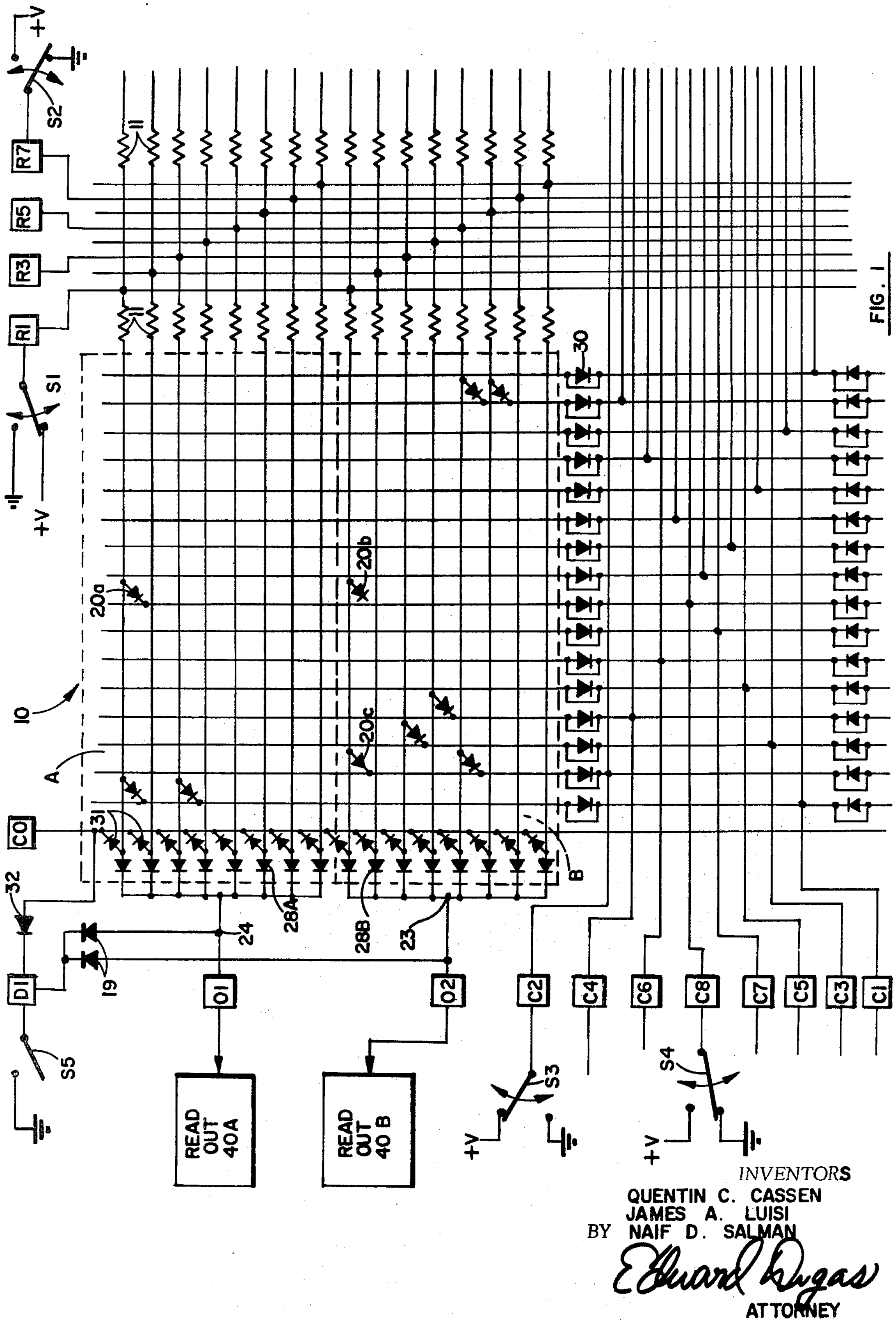
FIG. 1 is a schematic diagram of one quadrant of the read-only memory.

Referring to FIG. 1 wherein only one quadrant 10 of the diode matrix is shown for purposes of simplicity as the three remaining quadrants are identical to quadrant 10. Quadrant 10 is divided into sectors A and B. Each sector in the preferred embodiment consists of eight rows of conductors and sixteen columns of conductors which are normally insulated from each other and which are initially interconnected by means of diodes 20 which connect each row to each of the columns. The diode matrix thus formed may be encoded by eliminating the electrical connection to the diode at the intersection point between a row and column, either during metalization etching or in subsequent processing, thereby effectively preventing electrical connection between the respective row and column. One means and method which can effectively be used to encode a microminiature device of this size is disclosed in an application filed in the U. S. Pat. Office Oct. 3, 1968, Ser. No. 764,680 and entitled "Laser Encoding of Diode Arrays" by F. L. Chiaretta et al and assigned to North American Rockwell Corporation, the assignee of the present invention. In that application, there is disclosed a method and means for encoding a diode array by bombarding selected diodes or diode connections with a pulsed laser beam to burn away chosen areas. Removal of these areas from the diode matrix constitutes an encoding process by the elimination of the selected connection and/or diode. The parallel-coincident row selecting means is shown comprised of a positive voltage source connected to one terminal of switch S1 which in turn is connected to a row terminal labeled R1. Similar switches may be connected to each one of the row terminals R1 through R8. A second row selector means is shown connected to terminal R7, comprised of the switch S2 which, in the position shown, is connected to a reference potential (ground) but which may be switched to the other terminal which is connected to +*v* potential source. Although elementary switch means are shown, it is to be understood that more complex electronic switching means may be utilized to perform this particular function more effectively and the use of simple electrical switches is for the purpose of simplicity only. In operation of the matrix, if the row designated by R1 is to be selected, the switch S1 is connected to the +*v* terminal, thereby placing a potential on row 1 of the matrix. Diode 20*a* is shown connected to row 1 and the potential +*v* therefore is felt at its terminals. Diode 20*a* is connected to column 8 which in turn is connected to the column terminal C8. A parallel-coincident column selecting means comprised of a switch S4, one terminal of which is connected to ground and another terminal of which is connected to the +*v* potential, is shown in the grounded position, thereby allowing current to flow from the potential applied to R1, through a resistor 11 in row 1, through diode 20*a*, through S4 to ground. The resistance of resistor 11 is extremely high as compared with the forward resistance of diode 20*a*. Therefore, most of the potential +*v* will be dropped across resistor 11 and the potential across diode 20*a* appearing at the end of row 1 will be small with respect to the applied potential. If no output were desired from column 8, the switch S4 would be moved to the +*v* position, thereby applying a potential equal to the potential applied at the row to effectively cancel, or to back-bias diode 20*a* preventing current conduction therethrough. Passing through isolation diodes 28A, the potential at point 24 is the largest of the potentials of each row of sector A. The potential at point 24 passes through output terminal 01 to the sensing means 40A. R1 was the particular row selected in this first example with C8 being the column selected. But for a particular quadrant, there are two rows corresponding to row 1. There is one for sector A and one for sector B. There is only one particular column though that is selected at any point in time for a particular quadrant. Therefore, if a second diode were connected to row 1 of sector B and in turn to column C2 which is connected by means of switch S3 to a +*v* potential, then diode 20*c* would be back-biased and no current would flow through the diode but because diode 20*b* is not connected, current would flow through diode 28B to output terminal 02 and through the sensing means 40B to provide a high level potential indication. If S3 had been in the ground position and S4 in the +*v* position, the potential felt at output terminal 02 would have been low, thereby indicating the presence of the diode 20*c*. Two diodes 19 are shown, one connected to potential point 24 and the other connected to potential point 23. Diodes 19 connect points 23 and 24 to terminal D1. Terminal D1 is connectable by means of switch S5 to a ground potential. Switch S5 is activated after a read cycle to discharge any charge that may have collected on the memory. Diodes 30 are inserted into each column line to act as protectors when one of the diodes shorts to prevent the + voltage that would occur when switch S4 is positioned at the +*v* terminal from passing through the shorted diode to the output terminals, thereby giving a false indication. Diodes 30 are bypassed with a conductor which may be removed when error correcting codes are being used to compensate for faulty diodes. One additional column line labeled CO extends through both quadrants of the matrix and is connected to each row by means of diodes 31. Any indication appearing along any row is felt at terminal CO. A diode 32 connects the column line CO to the terminal D1.

Figure 2:
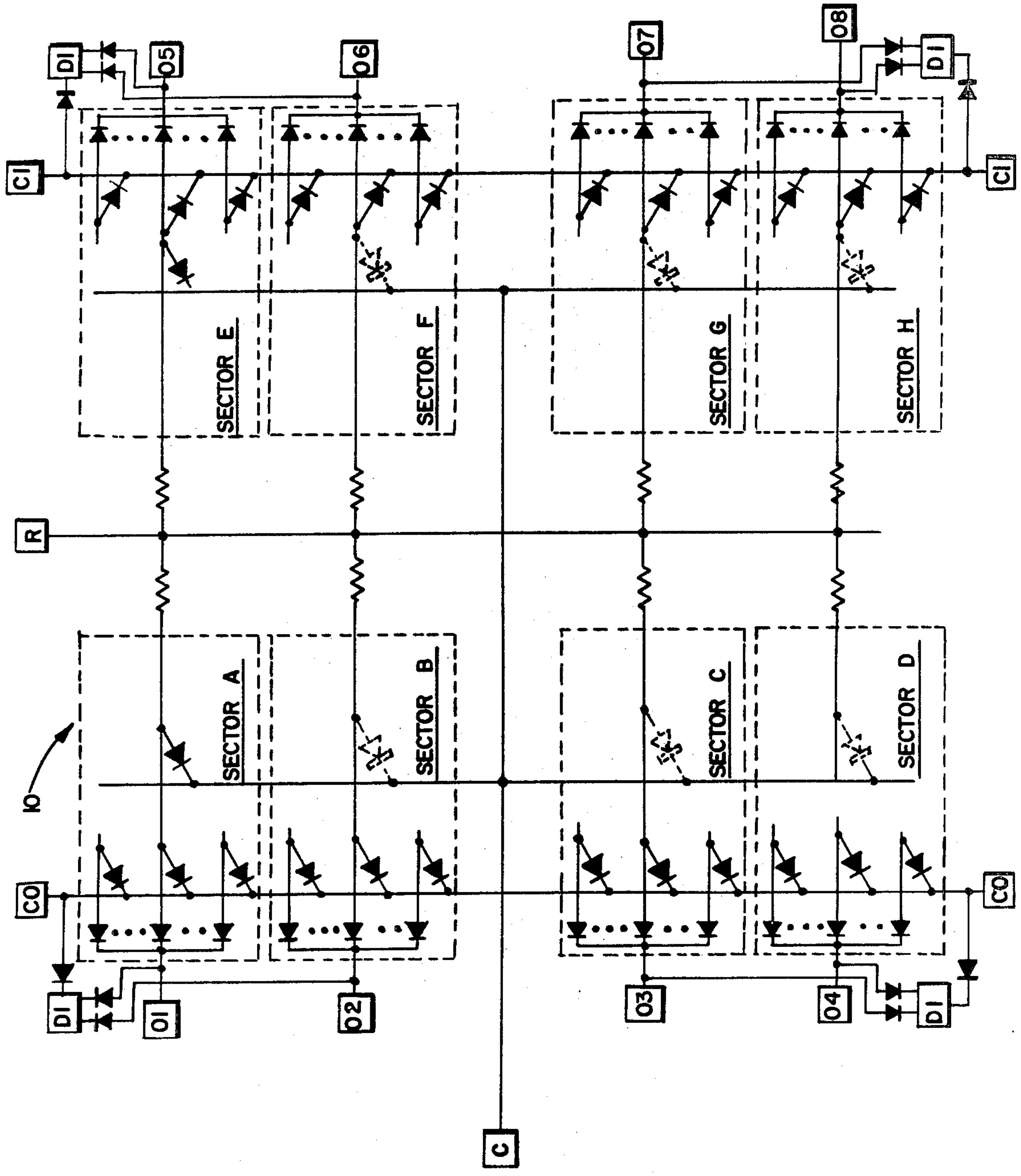
FIG. 2 is a simplified schematic diagram of the read-only memory.

Referring now to FIGURE 2, the entire diode matrix is comprised of sub-arrays called sectors A and B, which make up one quadrant, and sectors C and D, which make up another quadrant, and sectors E and F, which make still another quadrant, and sectors G and H, which make the last quadrant. Each of the eight sectors are shown as being identical with a common control line C1 shown for sectors E, F, G and H which corresponds to the common control line CO for sectors, A, B, C and D. Only one row and column is shown for each of the eight sectors. The dotted diodes represent diodes that have been completely removed or which are no longer electrically connected between a row and column. The operation of the diode memory is based upon parallel-coincident selection of eight bit locations. Each of the selected locations is in one of the designated sectors. When a diode is present at the selected row and column in a sector, the diode clamps the row to the column, the applied voltage +*v* drops across the serial resistor and virtually no current leaves the row by way of the output sensing terminals. When a diode is not present at the selected row and column of a sector, all of the current entering the row leaves through the output sensing terminal. This current can be used to activate a sense-gate or other read-out device.

Figure 3:
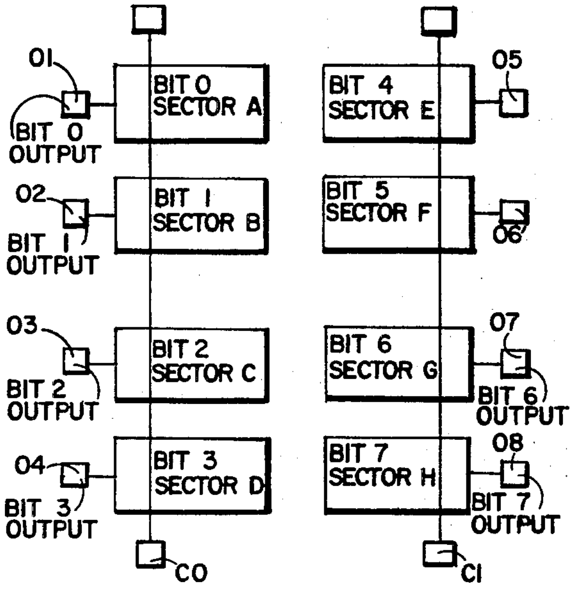
FIG. 3 is a block diagram of the read-only memory.

Referring now to FIGURE 3, by interconnecting the outputs of the sectors of the memory microcircuit in various configurations, different capabilities are achieved. For example, in FIGURE 3 a memory of 128 words of eight-bits is provided. Each of the sectors contain a distinct bit of each of the 128 words. When one of the rows and one of the columns of the array is selected, parallel-coincident selection of one bit in each of the sectors occurs. The output of each sector is then read out on the output terminals 01 through 08. The control lines CO and C1 are not used in this organization.

Figure 4:
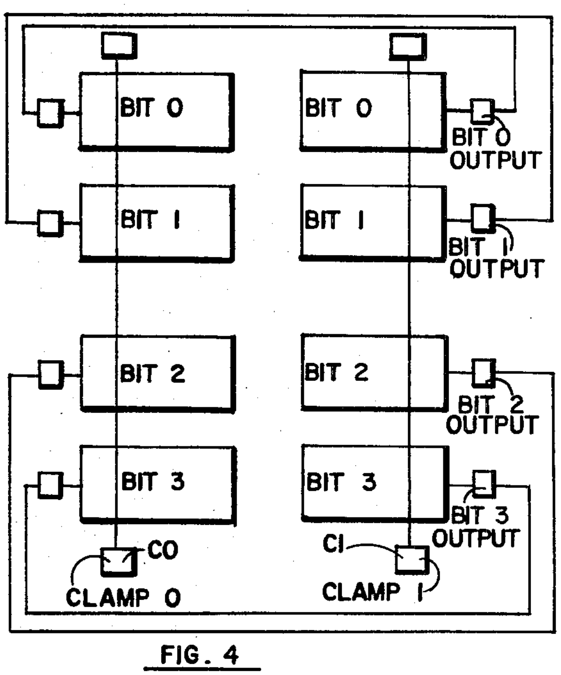
FIG. 4 is a block diagram of the read-only memory, the blocks of which are connected to provide a 256-word capability.

Referring now to FIGURE 4 wherein a memory of 256 words and four-bits is illustrated — this organization differs from the previous one in that sense lines 01 and 05 are connected together along with 02 and 06, and 03 and 07, and 04 and 08. The external connection provides the logic "OR" function. By using control lines CO and C1 as clamp lines and grounding one or the other of them with external circuitry, the output from the half of the array which is clamped to ground will not contribute to the output signal. In this manner, the signals from four of the sectors are read out during each interrogation.

Figure 5:
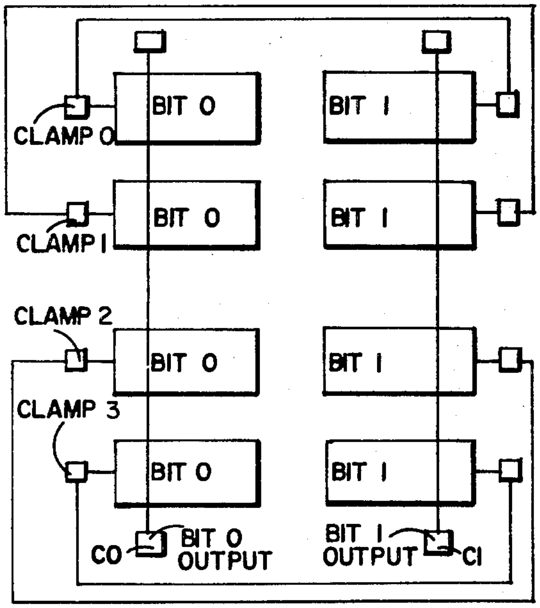
FIG. 5 is a block diagram of the read-only memory, the blocks of which are connected to provide a 512-word capability

Referring now to FIGURE 5, wherein a memory of 512 words of two-bits are illustrated, the first bit is stored in the left half of the array and the second bit is stored in the right half of the array. In this organization, terminals 01 through 08 are used as control lines rather than as output sense lines. Three of these four pairs of control lines are grounded during a read operation so that only two sectors of the array are interrogated at one time. Lines CO and C1 are used as the two output lines rather than as control lines. They collect data from the left half and the right half of the array, respectively.

Figure 6:
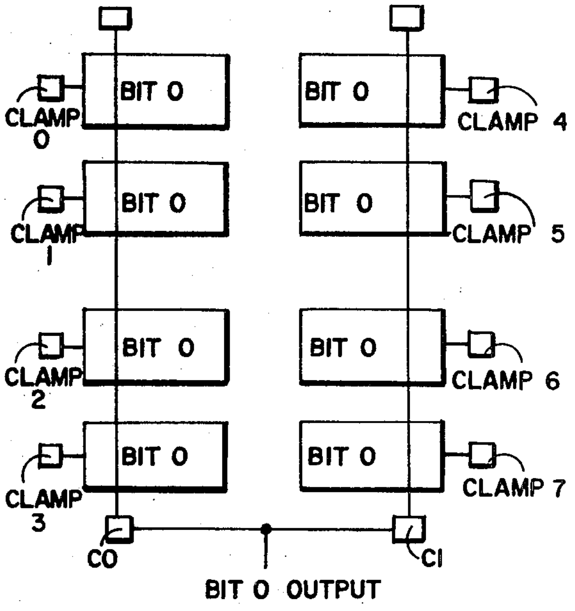
FIG. 6 is a block diagram of the read-only memory, the blocks of which are connected to provide a 1,024-word capability.

Referring to FIGURE 6 wherein a memory of 1,024 words of one-bit is illustrated — lines CO and C1 are connected together and used as the output line. In order for data from only one sector to be read out during the interrogation, terminals 01 through 08 are used as control lines. Seven of the eight of these are grounded during an interrogation by external decoding circuitry so that a bit from one of the sectors in the array is read out on the output line.

While there has been shown what is considered to be the preferred embodiment of the invention, it will be obvious that many changes and modifications may be made therein without departing from the essential spirit of the invention. It is intended, therefore, in the annexed claims, to cover all such changes and modifications that may fall within the true scope of the invention.

I claim:

1. A read-only memory comprising, a plurality of conductive rows and columns forming a matrix of insulated conductors, the intersection of said rows and columns determining memory storage locations for logical information, selected groups of said rows being connected together at distinct common outputs, a plurality of diodes connected between selected rows and columns for selectively storing logical information in the read-only memory, one type of logical information being stored by the presence of a diode between a selected row and column and a different type of logical information being stored by the absence of a diode between a selected row and column, means for simultaneously providing a first electrical impulse for selecting one row of each group of rows and means for providing a second electrical impulse for individually selecting a column of said plurality of columns for enabling the simultaneous readout of the logical information stored at a plurality of storage locations represented by the intersection of said selected rows and said selected column, said second electrical impulse providing back-bias of diodes connected to said column, said selected rows of each group of rows representing bit positions in a computer word represented by said selected column, a plurality of sensing means connected to the common output of each group of rows to sense the absence or the electrical back-bias of diode means connected between said selected rows and columns when a particular row of each group of rows and a column of said matrix have been selected for simultaneously reading out the stored logical information from the plurality of bit positions comprising a computer word, said absence or electrical back-bias of said diode means between said selected rows and columns preventing current flow between a selected row and column for enabling said first electrical impulse to appear at said sensing means.

2. The invention according to claim 1 wherein said sensing means in response to said first electrical impulse provides a first output indication from each of said common outputs for indicating the absence of current flow through a diode between the selected rows of each group of rows and each selected column of said matrix, said first output occurring if a diode is not present between a selected row and column or if a diode is present but is back-biased by said second electrical impulse, and a second output indication is provided from each of said common outputs if said first electrical impulse flows through a diode connected between a selected row and column and does not appear at said sensing means.

3. The invention according to claim 1 wherein a plurality of resistors having a resistance at least four times greater than the forward resistance of said diodes is serially connected, one each in said plurality of rows for providing a relatively large output current as a function of the presence or absence of a diode between the selected row and column whereby the memory readout time is reduced, said memory further comprising means for electrically interconnecting said common outputs for providing at least one output from the read only memory representing a logical function of the information stored in said groups.

4. The invention according to claim 1 wherein the diodes of all non-selected columns are back-biased by switchably connecting the non-selected columns to said second electrical impulse.

5. A read only memory comprising in combination:

a. a plurality of conductive rows and columns and divided into four quadrants, said quadrants further divided into equal sectors;

b. means for parallel-coincident selection of one row and column in each of said sectors;

c. a plurality of diode means individually connecting each row to each column where desired; and d. sensing means connected to the row conductors of each sector to sense the absence or electrical back-bias of a diode in each sector when a row and column have been selected, absence or electrical back-bias of said diode between a row and column preventing current flow between a selected row and column enabling an electrical impulse to appear at said sensing means.

6. The invention according to claim 5 wherein a plurality of resistors having a resistance value which is high as compared to the forward resistance value of said diodes is serially connected between the means for parallel-coincident selection of said rows.

* * * * *